UNITED STATES PATENT OFFICE.

CHARLES CATLETT, OF STAUNTON, VIRGINIA.

BONE-BLACK SUBSTITUTE AND METHOD OF MANUFACTURE.

SPECIFICATION forming part of Letters Patent No. 617,079, dated January 3, 1899.

Application filed January 25, 1897. Serial No. 620,687. (No specimens.)

*To all whom it may concern:*

Be it known that I, CHARLES CATLETT, of Staunton, in the county of Augusta and State of Virginia, have invented a new and useful Improvement in Filtering or Decolorizing Materials and in the Manufacture Thereof, of which the following is a full, clear, and exact description.

The object of my invention is principally to provide a material which can be used as a substitute for animal charcoal for filtering and decolorizing and other like purposes.

Having recognized the fact that the value of bone-charcoal as a filtering and decolorizing medium is due to the enormous surface of carbon exposed, I have discovered that an efficient substitute can be made by using clay as a base and covering the surface of its pores with a layer of carbon, preferably in at attenuated condition. By this means a very extended surface of active carbon is produced without substantially closing the pores, and thus I obtain a material which, although cheaper, is superior to bone-charcoal in that from its plastic nature at certain stages of its manufacture it may be molded into disks, tubes, and other desirable forms. It can be revivified and in all other respects treated and used as bone-charcoal, while by proper selection of clays it may be used as a filtering medium for substances for which bone-charcoal on account of its composition is not suitable. I have discovered also that the best mode of producing this result is to treat the clay with the carbonaceous material in the form of a dilute solution, the solvent being water or other liquid, depending upon the character of the material. Such dilute solution is desirable in order better to cover the pores with an attenuated layer of carbon with the least obstruction to the passage of the liquid through the pores when the material is used for filtering. I have found that important results are obtained by using such proportion of carbonaceous material as to leave in the clay after the same has been charred from four to eight and one-third per cent. of carbon, though the proportion may be lessened within the scope of my invention; but in no case should the proportion of residual carbon exceed eight and one-third per cent. of the mass.

It being desirable to use the material in a granulated form, I have discovered that by sizing the clay after treating with the carbonaceous solution and before charring the production of dust due to the crushing and sizing is reduced to a minimum and that, further, the dust that may be formed is not lost, but may be incorporated in a new portion of unsized material.

I have discovered also that certain natural clays contain the proper amount of carbonaceous material so disseminated as to form when charred the desired thin coating of carbon over the surface of the pores, and also that it is possible in those clays containing carbonaceous material in proportions insufficient to form such coating to add more carbonaceous material in dilute solution to produce the desired effect.

I shall now describe the best mode I know for applying my invention to practice, premising that those skilled in the art may within the limits of my claims vary the same in respect of the nature of the materials and the manner of their treatment. Different clays will of course require somewhat different manipulation; but the necessity for such variations will be readily apparent to one understanding the principle of my invention.

Starting on a new clay (for example, an ordinary residual or limestone clay) I add a solution of a low-grade sugar or syrup containing such proportions of sugar that its solid contents would represent about fourteen per cent. and not more than twenty-five per cent. of the weight of the clay and mix the two thoroughly together. The volume of the solution is such as to saturate the clay fully. The clay is then dried until it becomes tough and can be readily crushed and granulated and after being crushed it is sized by suitable screens. The material which is too large is recrushed and that which is too small is mixed with a fresh lot. The sized material is then charred in a closed retort, with the exclusion of air at a temperature which, while high enough to bake the clay, is not so high as to cause fusion of the clay and the closing of the pores. In treating limestone clay, which is readily fusible, the temperature should not exceed a low red heat. It is then cooled with exclusion of air, preferably washed and dried, and is ready for use. The material thus made is black or grayish in color. The carbon is uniformly spread over the surface of the pores as a thin coating, and that the porosity of the material has not been impaired is evidenced by the readiness with which it absorbs liquids. Like good bone-charcoal it adheres with great readiness to the tongue. The proportion of syrup above noted will afford the requisite amount of carbon in the finished product.

Instead of syrup or sugar other forms of carbonaceous matter and liquid solvents other than water may be used. For example, I may employ aqueous solutions of starch, glucose, glue, or solutions of coal-tar, cotton-seed oil, and other vegetable oils or petroleum and its products in suitable solvents.

In using natural carbonaceous clays I may take, for example, a clay found near Stuart's Draft, on the Shenandoah Valley Branch of the Norfolk & Western Railroad, in Virginia, containing the requisite small proportion of carbonaceous matter and which yields the proper amount of carbon coating in the pores of the finished product. Many other similar carbonaceous clays are to be found in various portions of the United States. Such clay is moistened with water mixed to a uniform consistency, is dried, crushed, sized, and charred, as above stated. This clay, being very refractory, can be charred at a relatively high temperature without injury.

Good results can be produced by treating a clay which has already been baked at a temperature not high enough to cause a closing of its pores with a dilute solution of carbonaceous material containing sufficient carbonaceous material to provide the requisite amount of carbon and so diluted as to saturate said clay, (and thus uniformly spread the carbon over the pores,) then drying and charring in closed retorts. In this mode of practicing the invention the clay, while preferably sized before baking, may either be crushed and sized after baking and before treating with the solution of carbonaceous material, or it may be crushed and sized after treating with the carbonaceous solution and before charring, or it may be crushed and sized after charring.

In treating raw clay with an aqueous solution it becomes soft and plastic and may be molded, and on drying it becomes hard (becoming soft again, however, on the addition of water) and may be crushed and sized. Clay does not, however, become soft on the addition of most of the other solvents, though it absorbs them readily, nor does it become hard when they are driven off. Therefore when using such solvents the clay should be moistened with water and molded or dried and sized before adding the solution of carbonaceous material when other solvent than water is employed. The solvent is then recovered and the material charred. In a similar manner carbonaceous material requiring solvents other than water may be applied to the baked clay.

Instead of granulating the product it may be molded into filters in the form of disks, tubes, or vessels.

I claim—

1. The method of treating clay to obtain a filtering or decolorizing material, consisting in covering the surface of its pores with a thin layer of carbonaceous matter, not greater in proportion when charred than eight and one-third per cent. of the mass, and drying, fracturing and sizing and then baking the same in a closed vessel at a temperature below its fusing-point.

2. The method of treating clay to obtain a filtering or decolorizing material, consisting in covering the surface of its pores with a thin layer of dilute liquid carbonaceous matter, not greater in proportion when charred than eight and one-third per cent. of the mass and drying, fracturing, and sizing and then baking the same in a closed vessel at a temperature below its fusing-point.

3. The method herein described of making filtering or decolorizing material of clay charged with carbonaceous liquid, which consists in drying and fracturing and sizing the same before charring.

4. The method herein described of making filtering or decolorizing material, which consists in treating clay with carbonaceous liquid, then drying and fracturing and sizing the same, and then charring.

5. A new composition of matter consisting of baked clay having open pores whose walls are coated with charred carbon not greater when charred than eight and one-third per cent. of the mass.

6. A new composition of matter consisting of clay having open pores whose walls are coated with carbon in the form of an attenuated film, substantially in proportion when charred of from four to eight and one-third per cent. of the mass.

7. A molded filter composed of clay whose pores have a charred carbon coating, the carbon being present substantially in proportion when charred of from four to eight and one-third per cent. of the mass.

In testimony whereof I have hereunto set my hand this 22d day of January, 1897.

CHARLES CATLETT.

In presence of—
THOMAS W. BAKEWELL,
M. G. HUBBARD, Jr.